(12) United States Patent
Norton et al.

(10) Patent No.: US 11,555,569 B2
(45) Date of Patent: Jan. 17, 2023

(54) UTILITY COUPLER WITH LOCKING HANDLE

(71) Applicant: ATI Industrial Automation, Inc., Apex, NC (US)

(72) Inventors: Daniel Allen Norton, Apex, NC (US); Jordan Thomas Pendleton, Raleigh, NC (US)

(73) Assignee: ATI Industrial Automation, Inc., Apex, NC (US)

( * ) Notice: Subject to any disclaimer, the term of this patent is extended or adjusted under 35 U.S.C. 154(b) by 597 days.

(21) Appl. No.: 16/558,665

(22) Filed: Sep. 3, 2019

(65) Prior Publication Data

US 2021/0062949 A1   Mar. 4, 2021

(51) Int. Cl.
| | |
|---|---|
| *F16L 37/18* | (2006.01) |
| *F16L 37/20* | (2006.01) |
| *F16L 23/036* | (2006.01) |
| *F16L 41/00* | (2006.01) |
| *E02F 9/22* | (2006.01) |

(52) U.S. Cl.
CPC ............ *F16L 37/18* (2013.01); *F16L 23/036* (2013.01); *F16L 37/20* (2013.01); *F16L 41/001* (2013.01); *E02F 9/2275* (2013.01)

(58) Field of Classification Search
CPC ......... F16L 37/18; F16L 37/20; F16L 23/036; F16L 41/001
See application file for complete search history.

(56) References Cited

U.S. PATENT DOCUMENTS

| | | | | | |
|---|---|---|---|---|---|
| 397,187 | A | * | 2/1889 | Holton et al. ......... | F16L 37/20 285/311 |
| 935,587 | A | * | 9/1909 | Casey ..................... | F16L 37/20 285/259 |
| 969,019 | A | * | 8/1910 | Wilson et al. .......... | F16L 37/20 285/332 |
| 1,361,856 | A | * | 12/1920 | Heininger ............... | F16L 37/20 285/311 |
| 1,793,015 | A | * | 2/1931 | Roos ....................... | F16L 37/20 285/330 |
| 3,214,195 | A | | 10/1965 | Zahuranec et al. | |

(Continued)

FOREIGN PATENT DOCUMENTS

| | | | |
|---|---|---|---|
| DE | 102006010165 A1 | 9/2007 | |
| DE | 102006060005 A1 * | 10/2007 | ............. F16L 37/18 |

(Continued)

*Primary Examiner* — Matthew Troutman
*Assistant Examiner* — Fannie C Kee
(74) *Attorney, Agent, or Firm* — Coats & Bennett, PLLC

(57) ABSTRACT

A utility coupler that includes a coupling unit and a tool unit that can be selectively engaged together. The coupling unit may include a body, a cam member, a handle, and one or more utility couplings. The tool unit may include a body, a latching pin, and one or more utility couplings. In operation, the coupling unit may be placed into a decoupled position with the handle in a first position. The coupling unit may be moved into proximity of the tool unit. The handle may be moved to a second position causing the cam member to engage with the latching pin and couple the coupling unit to the tool unit. The utility couplings engage together to pass the one or more utilities to the industrial equipment.

20 Claims, 16 Drawing Sheets

(56) References Cited

U.S. PATENT DOCUMENTS

| | | | |
|---|---|---|---|
| 3,830,525 A * | 8/1974 | Ransford, III | F16L 37/18 403/2 |
| 4,318,557 A | 3/1982 | Bourne et al. | |
| 4,568,110 A | 2/1986 | Momberg | |
| 4,634,204 A | 1/1987 | Detter et al. | |
| 4,768,815 A | 9/1988 | Harmon | |
| 4,842,543 A | 6/1989 | Davis | |
| 5,316,347 A | 5/1994 | Arosio | |
| 5,620,212 A | 4/1997 | Bourne et al. | |
| 5,713,752 A | 2/1998 | Leong et al. | |
| 5,741,150 A | 4/1998 | Stinson et al. | |
| 5,951,316 A | 9/1999 | Kawano et al. | |
| 5,961,162 A | 10/1999 | Gläser et al. | |
| 5,984,382 A | 11/1999 | Bourne et al. | |
| 6,149,451 A | 11/2000 | Weber | |
| 6,189,349 B1 | 2/2001 | Helot et al. | |
| 6,234,426 B1 | 5/2001 | Renken et al. | |
| 6,279,971 B1 | 8/2001 | Dessenberger, Jr. | |
| 7,389,794 B2 | 6/2008 | Knuthson | |
| 8,251,761 B2 | 8/2012 | Shamoto et al. | |
| 8,322,566 B2 | 12/2012 | Hackett | |
| 8,794,993 B2 | 8/2014 | Norton | |
| 11,079,053 B2 * | 8/2021 | Wolf | F16L 37/18 |
| 2005/0255737 A1 | 11/2005 | Bella et al. | |
| 2005/0285390 A1 | 12/2005 | Martin | |
| 2006/0094281 A1 | 5/2006 | Dang | |
| 2007/0134994 A1 | 6/2007 | Fukatsu et al. | |
| 2009/0058077 A1 | 3/2009 | Schulz et al. | |
| 2011/0086520 A1 | 4/2011 | Mills et al. | |
| 2011/0256753 A1 | 10/2011 | Gulla | |
| 2017/0202128 A1 * | 7/2017 | Emmert | F16L 37/18 |
| 2019/0093808 A1 * | 3/2019 | Danelli | F16L 37/20 |
| 2019/0242511 A1 * | 8/2019 | Danelli | F16L 37/18 |

FOREIGN PATENT DOCUMENTS

| | | | |
|---|---|---|---|
| DE | 102017200743 A1 * | 7/2017 | F16L 37/18 |
| DE | 102016004069 A1 * | 10/2017 | F16L 37/18 |
| EP | 1657481 A2 * | 5/2006 | F16L 37/18 |

* cited by examiner

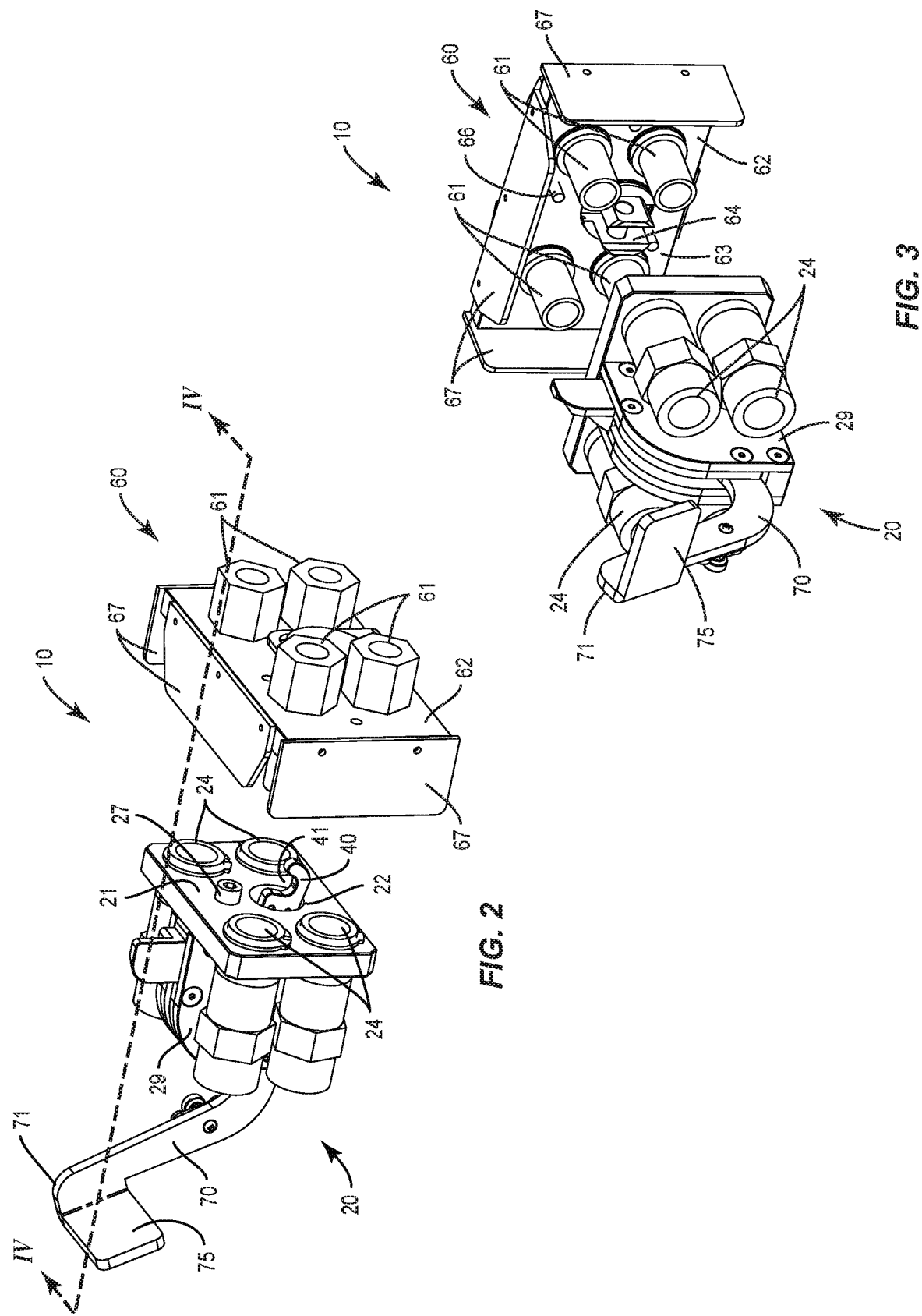

UTILITY COUPLER WITH LOCKING HANDLE

FIELD OF INVENTION

The present invention relates generally to utility couplers and, in particular, to a utility coupler operative to mate industrial equipment to a utility supply and prevent its inadvertent uncoupling.

BACKGROUND

Industrial equipment, such as automotive and aviation manufacturing equipment, often requires utilities for operation. The utilities can include, for example, compressed air, hydraulic fluid, electrical power, data signals, and the like. For modularity of design, ease of reconfiguration, ease of maintenance and upgrade, and similar reasons, it is advantageous not to install permanent utility couplings on all industrial equipment. Rather, the equipment may be fitted with a utility coupler. As used herein, a utility coupler is a device comprising two units—referred to herein as a tool unit and a coupling unit—that may be selectively coupled together and decoupled from each other. When coupled, mating utility couplings provide for the passing of utilities across the utility coupler interface. A tool unit of the utility coupler is rigidly affixed to industrial equipment, and the utility couplings of the tool unit attached to provide the utility to the equipment. Corresponding utility couplings of a coupling unit of the utility coupler are attached to a source and/or sink of the utility. When the industrial equipment is activated, the appropriate (preconfigured) utilities are provided by simply coupling the utility unit to the tool unit. In many cases, the coupling unit is preferably manually coupled to the tool unit.

The coupling unit and the tool unit should be securely engaged together. This ensures that the one or more utilities can be effectively passed to the industrial equipment. Insecure engagement between these members could lead to a leak of one or more of the utilities.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

One aspect is directed to a utility coupler operative to provide one or more utilities to industrial equipment. The utility coupler comprises a tool unit operatively connected to the industrial equipment. The tool unit comprises a latching pin and one or more first utility couplings. The utility coupler also comprises a coupling unit having a body with a front face, one or more second utility couplings, a handle is pivotally connected to the body and movable between a first position and a second position, and a cam member movably attached to the body and the handle with the cam member comprising a receptacle. In the first position, the cam member is aligned at a first angle relative to the front face of the body to position the receptacle away from the latching pin of the tool unit. In the second position, the cam member is aligned at a second angle relative to the front face of the body that is different than the first angle to engage the receptacle with the latching pin of the tool unit and to couple together the one or more first and second utility couplings to pass the utilities to the industrial equipment.

In another aspect, a connector on the body contacts against a first surface on the cam member and with the first surface having a non-linear shape for the cam member to change from the first angle to the second angle and inward relative to the front face when the handle moves from the first position to the second position.

In another aspect, the connector is a first connector and the first surface is formed within a first slot, and further comprising a second connector on the body that extends through a second slot in the cam member, the second slot having a second surface that is straight and having a shorter length than the first surface.

In another aspect, the handle comprises a plurality of rigid members that are pivotally connected together.

In another aspect, the plurality of rigid members comprises first and second rigid members with contact surfaces that are spaced apart in the first position and that abut together in the second position to prevent movement of the handle from the second position to the first position.

In another aspect, the receptacle of the cam member is positioned outward beyond the front face of the body and a connector that pivotally connects the handle to the body is positioned inward of the front face of the body.

In another aspect, the handle is in an overlapping position with the tool unit in one of the first and second positions.

One aspect is directed to a utility coupler operative to provide one or more utilities to industrial equipment. The utility coupler comprises a tool unit operatively connected to the industrial equipment. The tool unit comprises a first body, a latching pin attached to the first body, and one or more first utility couplings. The utility coupler also comprises a coupling unit comprising a second body, a cam member movably attached to the second body and comprising a receptacle, a handle pivotally connected to the second body and also connected to the cam member with the handle movable between a first position and a second position, and one or more second utility couplings operative to mate with the first utility couplings. In the first position, the cam member extends outward beyond the second body by a first distance and is aligned at a first angle relative to the second body to position the receptacle away from the latching pin of the tool unit. In the second position, the cam member extends outward beyond the second body by a second distance that is smaller than the first distance and is aligned at a second angle relative to the second body that is different than the first angle to engage the receptacle with the latching pin of the tool unit and with the one or more first and second utility couplings being coupled together to pass the one or more utilities to the industrial equipment.

In another aspect, the second body comprises a front face, the receptacle is positioned on a first side of the front face in both the first and second positions, and the handle being pivotally connected to the second body at a pivot that is positioned on an opposing second side of the front face.

In another aspect, the cam member comprises one or more slots that each extend along the cam member and are engaged by a connector on the body of the coupling unit, each of the one or more slots comprising a first end and an opposing second end with the connector positioned at the first end in the first position and at the second end in the second position.

In another aspect, one of the slots comprises a first surface at the first end and a second surface at the second end with the first and second surfaces being straight and being aligned at an obtuse angle relative to one another.

In another aspect, the handle comprises a plurality of individual rigid members that are pivotally connected to each other.

One aspect is directed to a method of supplying utilities to industrial equipment that is operatively connected to a tool unit. The method comprises: positioning a coupling unit at the tool unit while a handle of the coupling unit is in a first position that locates a cam member of the coupling unit that is connected to the handle in a first angular position away from a latching pin of the tool unit; pivoting the handle and moving a first section of a surface on the cam member along a connector and moving the cam member towards the latching pin to a second angular position and engaging the latching pin; and pivoting the handle and moving a second section of the surface along the connector and linearly moving the cam member and engaging second utility couplings on the coupling unit with the one or more first utility couplings of the tool unit.

In another aspect, the method further comprises pivoting the handle a first amount and moving the first section of the surface along the connector and then pivoting the handle an additional second amount and linearly moving the cam member.

In another aspect, the method further comprises maintaining the cam member at the second angular position while moving a second section of the surface along the connector and linearly moving the cam member.

In another aspect, linearly moving the cam member comprises retracting the cam member into the coupling unit and pulling the tool unit into engagement with the coupling unit and engaging the one or more first and second utility couplings.

In another aspect, the surface is positioned within a slot.

In another aspect, the method further comprises pivoting the handle to a closed position with the first and second utility couplings engaging together and abutting together ends of first and second members of the handle and preventing the handle from moving from the closed position back towards an open position.

In another aspect, the method further comprises pivoting the handle a first amount and pivoting the cam member to the second angular position that engages the latching pin prior to pivoting the handle an additional second amount that linearly moves the cam member and engages the first and second utility couplings.

In another aspect, moving the handle comprises pivoting the handle about a pivot that is positioned on a first side of a face of the coupling unit and maintaining the receptacle of the cam member on an opposing side of the face of the coupling unit.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout. Accordingly, terms of reference such as up, down, left, right, vertical, horizontal, and the like, which are used herein for clarity of expression, apply only to the orientation of elements in the drawings and are hence relative, and not absolute, directions. Naturally, in use, the elements depicted in the drawings may assume any orientation or be viewed from a different perspective.

FIG. 2 is a front perspective view of a utility coupler that includes a coupling unit and a tool unit in a disengaged position.

FIG. 3 is a rear perspective view of a utility coupler that includes a coupling unit and a tool unit in a disengaged position.

DETAILED DESCRIPTION

Figure 1:
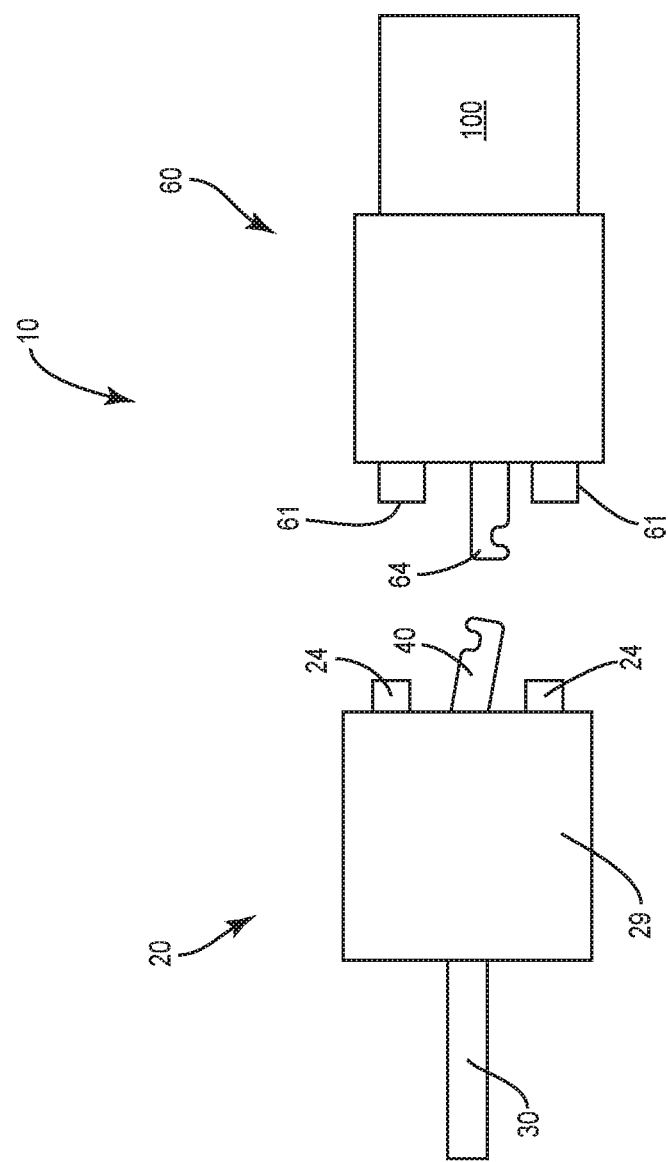
FIG. 1 is a schematic diagram of a utility coupler that includes a coupling unit and a tool unit in a disengaged position.

The present application is directed to a utility coupler 10 operative to provide one or more utilities to industrial equipment 100. As schematically illustrated in FIG. 1, the utility coupler 10 includes a coupling unit 20 and a tool unit 60. The coupling unit 20 includes a body 29, one or more utility couplings 24, a handle 30, and a cam member 40. The tool unit 60 is affixed to the industrial equipment 100 and includes a latching pin 64 and one or more utility couplings 61. The handle 30 is configured to engage and disengage the coupling unit 20 and the tool unit 60. When the handle 30 is in a first position, the cam member 40 is aligned at a first angle away from the latching pin 64 resulting in the coupling unit 20 being disengaged from the tool unit 60. When the handle 30 is in a second position, the cam member 40 is aligned at a second angle to engage with the latching pin 64 to engage the coupling unit 20 with the tool unit 60. When engaged, the utility couplings 24, 61 are coupled together to pass the utilities to the industrial equipment 100.

Figure 4:
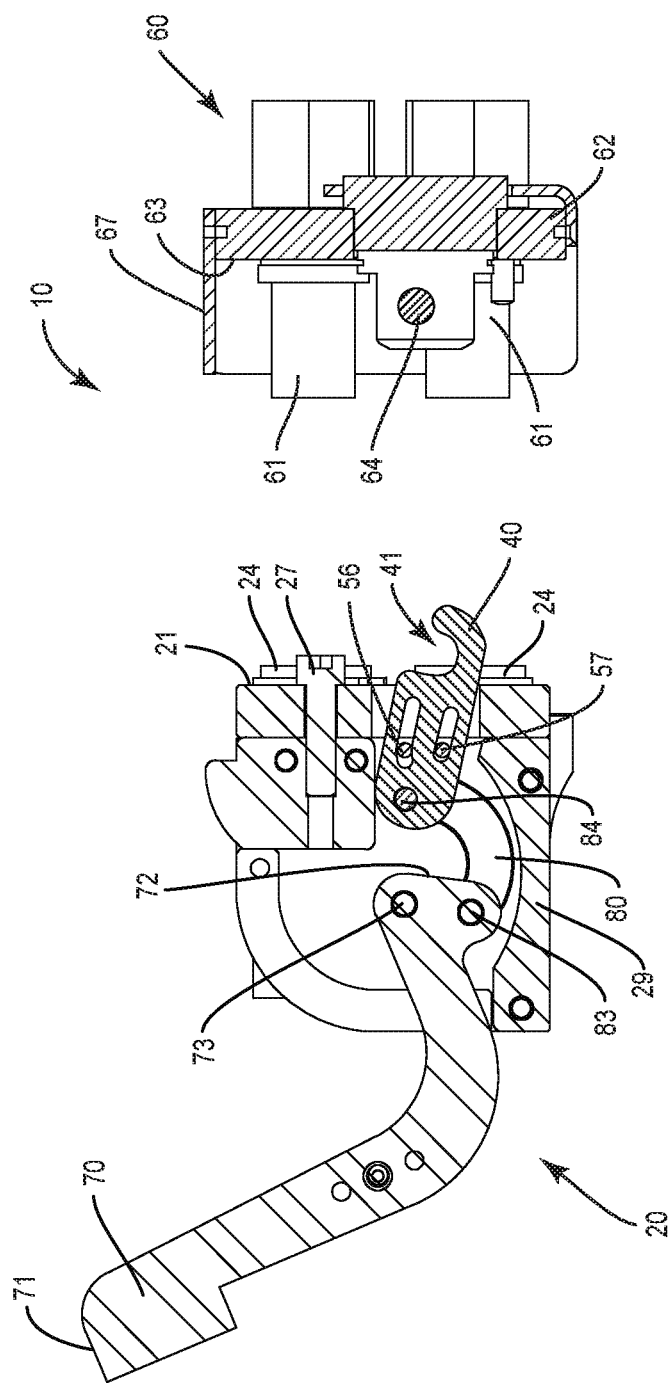
FIG. 4 is a section view of the utility coupler cut along line IV-IV of FIG. 2.

FIGS. 2, 3, and 4 illustrate a utility coupler 10 that includes a coupling unit 20 and a tool unit 60. The utility coupler 10 is configured for the coupling unit 20 and the tool unit 60 to be selectively coupled together and decoupled. In the particular embodiment depicted herein, and used to describe the features of embodiments of the present invention, the coupling mechanism of the utility coupler 10 is manually actuated. However, in other embodiments, the coupling mechanism may be actuated automatically, via robotics, or otherwise. Accordingly, the manually actuated embodiment is not a limitation of the present invention.

The coupling unit 20 includes a body 29, a cam member 40, a handle 30, and one or more utility couplings 24. The tool unit 60 includes a body 62, a latching pin 64, and one or more utility couplings 61. In operation, the coupling unit 20 is placed into a decoupled position with the handle 30 in a first position shown in FIGS. 2, 3, and 4. The coupling unit 20 is then moved into abutting contact with the tool unit 60. The handle 30 is moved to a second position causing the cam member 40 to engage with the latching pin 64 and couple the coupling unit 20 to the tool unit 60. The utility couplings 24, 61 engage together to pass the one or more utilities to the industrial equipment.

The coupling unit 20 includes the body 29 that has a front face 21 that faces towards the tool unit 60. In one example, the front face 21 is formed by a plate with a planar front surface. The front face 21 includes a first opening 22 through which the cam member 40 extends. The one or more utility couplings 24 extend through the front face 21 and are exposed for engagement with the tool unit 60. The utility couplings 24 are operative to mate to corresponding utility couplings 61 in the tool unit 60. One or more alignment pins 27 can protrude from the front face 21 and mate with corresponding alignment members 66 on the tool unit 60 to align the coupling unit 20 and the tool unit 60.

Figure 5:
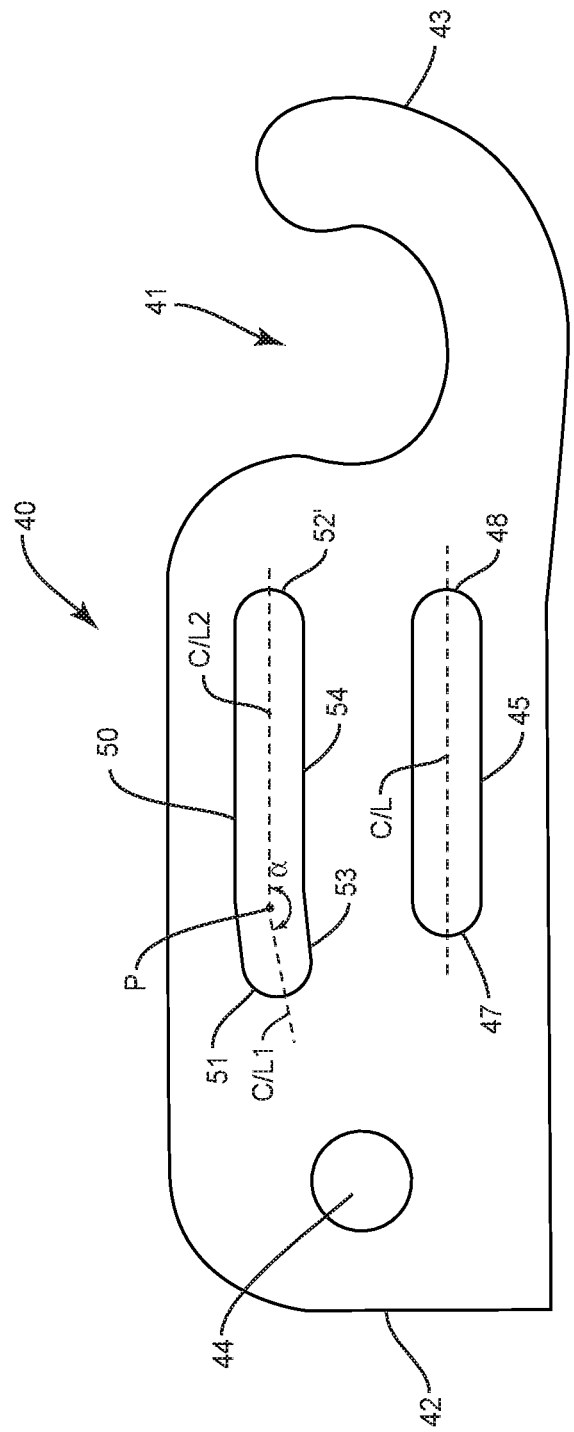
FIG. 5 is a side view of a cam member.

The cam member 40 protrudes from the body 29 and includes a receptacle 41 to selectively engage with the tool unit 60. As illustrated in FIG. 5, the cam member 40 includes a first end 42 and a second end 43. The receptacle 41 that receives the latching pin 64 of the tool unit 60 is positioned in proximity to the second end 43. An opening 44 in proximity to the first end 42 provides for a fastener to connect the cam member 40 to the body 29.

A pair of slots 45, 50 extends along a central area of the cam member 40. Connectors 56, 57 (see FIG. 4) extend from the body 29 and are positioned in the slots 45, 50 respectively to connect the cam member 40 to the body 29. The connectors 56, 57 slide along one or more surfaces of the slots 45, 50. The first slot 45 extends between first and second ends 47, 48 and has a straight centerline C/L. The second slot 50 includes a first end 51 and a second end 52. A first section 53 extends between the first end 51 to a point P and includes a straight centerline C/L1. A second section 54 extends between the second end 52 and the point P and includes a straight centerline C/L2. The centerlines C/L1, C/L2 are aligned at an obtuse angle α. In one example, the slot 50 includes a length measured between the first and second ends 51, 52 that is greater than a length of the slot 45 (measured between the first and second ends 47, 48). In one example, the slot 50 extends farther towards the first end 42 of the cam member 40 than the slot 45. In one example, the first end 51 of slot 50 is in closer proximity to the first end 42 of the cam member 40 than the first end 47 of slot 45.

The handle 30 is connected to the cam member 40 to selectively move the cam member 40 in a linear direction relative to the front face 21 between engaged and disengaged positions. The handle 30 includes a lever arm 70 and a connector arm 80. The lever arm 70 includes an elongated shape with opposing first and second ends 71, 72 and has a curved shape. A plate 75 is positioned at the first end 71 and extends outward at a transverse angle to provide a surface for applying a force to the handle 30 to move between the first and second positions. A connector 73 pivotally connects the lever arm 70 to the body 29.

The connector arm 80 extends between the lever arm 70 and the cam member 40. The connector arm 80 includes a curved shape with a first end pivotally connected to the lever arm 70 with connector 83 and a second end pivotally connected to the cam member 40 with connector 84.

The tool unit 60 which, in operation, is rigidly affixed to the industrial equipment 100. The tool unit 60 includes a body 62 with a front face 63 that faces towards the coupling unit 20. Plates 67 can be attached at the perimeter edges of the body 62 and extend outward beyond the front face 63. The utility couplings 61 extend through the front face 63 and engage with the corresponding utility couplings 24 of the coupling unit 20. In one example, the utility couplings 61 comprise openings that extend into and/or receive the utility couplings 24 that extend outward beyond the body 29 of the coupling unit 20. The utility couplings 24, 61 when mated together are configured to pass materials, such as pneumatic or hydraulic fluid. The latching pin 64 is positioned to engage with the cam member 40. The latching pin 64 can be mounted to an extension that extends outward beyond the front face 63.

The coupling unit 20 and the tool unit 60 are configured to engage together to couple the utility couplings 24, 61. This provides for the one or more utilities to pass to the industrial equipment 100 that is associated with the tool unit 60. The handle 30 can be selectively positioned to engage and disengage the coupling unit 20 with the tool unit 60. The movement of the handle 30 selectively positions the cam member 40 to engage and disengage with the latching pin 64.

Figure 6:
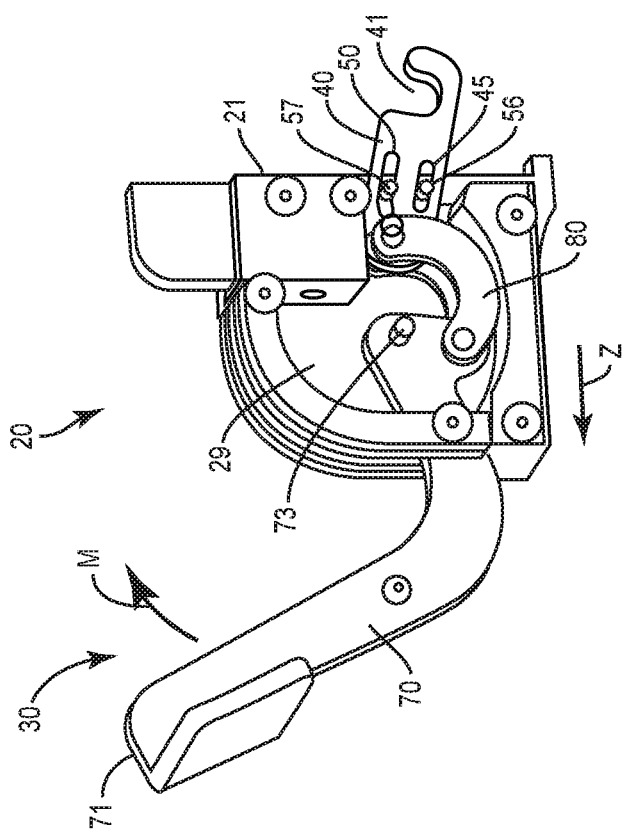
FIG. 6 is a perspective view of a coupling unit in a first position.

FIG. 6 illustrates the coupling unit 20 in a first position to be disengaged from the tool unit 60. The handle 30 is positioned with the lever arm 70 pivoted to a downward position about the connector 73. The coupling unit 20 would be in this position when aligning the coupling unit 20 to the tool unit 60 prior to engagement. In this first position, the cam member 40 extends outward beyond the front face 21 and is positioned at a first angular position relative to the front face 21. The cam member 40 is further positioned outward with the connectors 56, 57 located at the first ends 47, 51 of the respective slots 45, 50. This locates the connector 57 along the first section 53 of the slot 50 and positions the cam member 40 at the angular position.

Movement of the lever arm 70 in the direction indicated by arrow M in FIG. 6 causes the cam member 40 to angularly move and to pull inward to engage with the tool unit 60. The movement applies a force in the direction of arrow Z to the connection arm 80 and the cam member 40. The cam member 40 pivots about the connector 56 in the first slot 45 as the second slot 50 slides along the connector 57. This movement causes the slot 50 to slide along connector 57 with the connector 57 moving from the first end 51 of the slot 50 to the point P (i.e., the first section 53 of the slot 50 moves along the connector 57). This causes a change in the angular orientation of the cam member 40. In one example, this angular movement causes the cam member 40 to engage with the latching pin 64. Additional movement of the lever arm 70 in the direction of arrow M causes the connector arm 80 and the cam member 40 to move farther in the direction of arrow Z. The slots 45, 50 in the cam member 40 slide along the connectors 56, 57 until the connectors 56, 57 contact against the second ends 48, 52 of the slots 45, 50 respectively. The cam member 40 retracts inward in the body 29. This can provide for the coupling unit 20 and tool unit 60 to move together and for the utility couplings 24, 61 to engage together.

The connectors 56, 57 slide along the surfaces of the slots 45, 50. In another example, one or both connectors 56, 57 slide along one or more surfaces on the exterior of the cam member 40.

Figure 7:
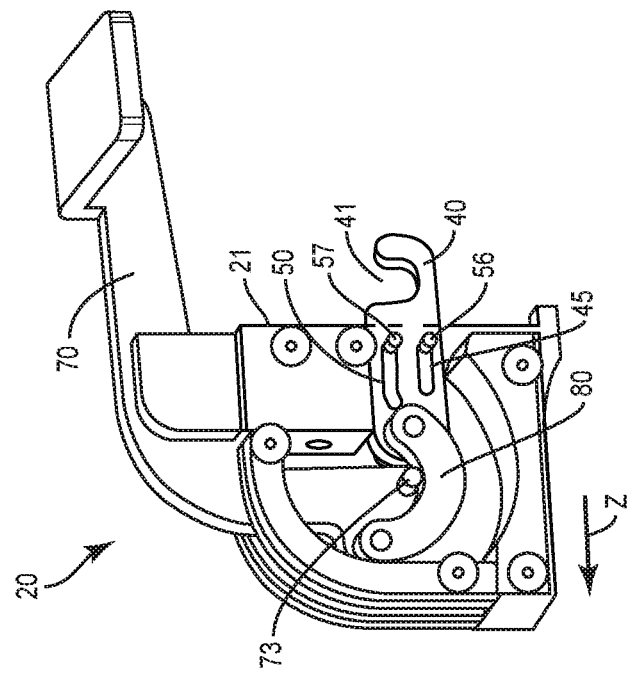
FIG. 7 is a perspective view of a coupling unit in a second position.

FIG. 7 illustrates the coupling unit 20 in a second closed position after the lever arm 70 has pivoted farther about the connector 73. This can include when the coupling unit 20 is engaged with the tool unit 60 and the cam member 40 is engaged with the latching pin 64. In one example, the lever arm 70 contacts against the body 29 and causes an audible or tactile indicator to the user. This indicator confirms to the user that the handle 30 is in the locked position. In the second position, the handle 30 is positioned in an overlapping arrangement with the tool unit 60.

Figure 9:
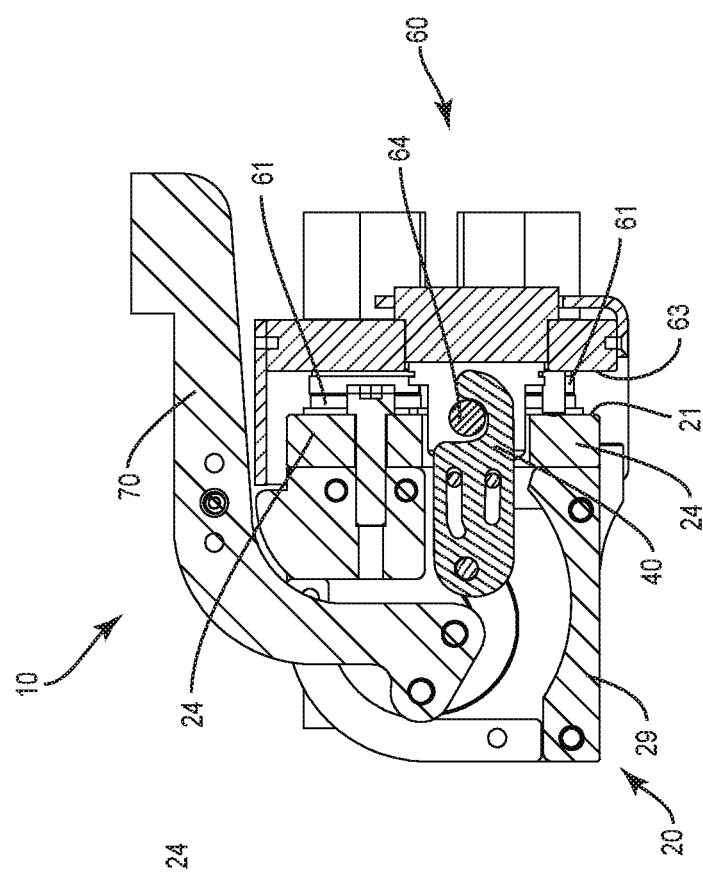
FIG. 9 is a section view of the utility coupling cut along line IX-IX of FIG. 8.
Figure 8:
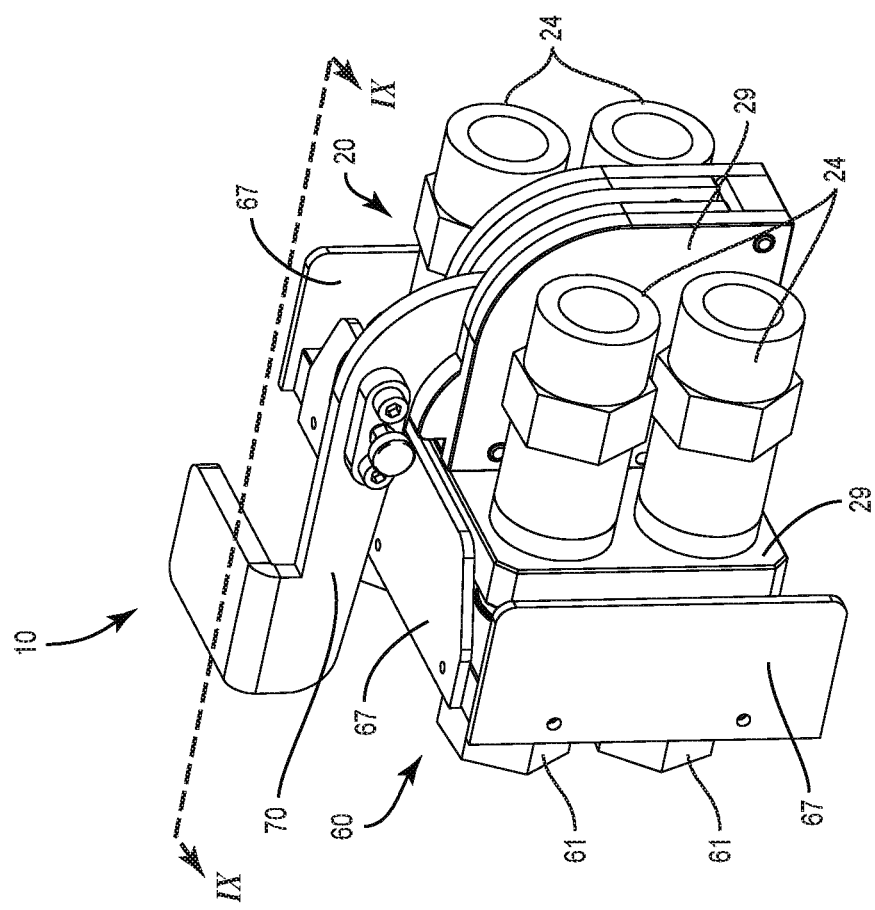
FIG. 8 is a perspective view of a utility coupling in an engaged position.

FIGS. 8 and 9 illustrate the utility coupler 10 in an engaged position. The cam member 40 of the coupling unit 20 is engaged with and pulled inward with the latching pin 64 of the tool unit 60. The front face 21 of the coupling unit 20 is in proximity to or contacting against the front face 63 of the tool unit 60. The utility couplings 24, 61 are engaged together to provide for the movement of utilities through the coupling unit 20 and into the tool unit 60. The handle 30 is positioned with the lever arm 70 positioned against the side of the body 29.

FIGS. 10-18 illustrate another utility coupler 10' that includes a coupling unit 20' and a tool unit 60' affixed to industrial equipment 100'. The coupling unit 20' includes a body 29', a cam member 40', a handle 30', and one or more utility couplings 24'. The tool unit 60' includes a body 62', a latching pin 64', and one or more utility couplings 61'. In operation, the coupling unit 20' is placed into a decoupled position with the handle 40' in a first position shown in FIGS. 10 and 11. The coupling unit 20' is moved into abutting contact with the tool unit 60'. The handle 30' is moved to a second position causing the cam member 40' to engage with the latching pin 64' and couple the coupling unit 20' to the tool unit 60'. The utility couplings 24', 61' engage together to pass the one or more utilities to the industrial equipment.

The coupling unit 20' includes the body 29' that has a front face 21' that faces towards the tool unit 60'. In one example, the front face 21' is formed by a plate with a planar front surface. The front face 21' includes a first opening 22' through which the cam member 40' extends. One or more utility couplings 24' extend through the front face 21' and are exposed for engagement with the tool unit 60'. The utility couplings 24' are operative to mate to corresponding utility couplings 61' in the tool unit 60'. One or more alignment pins (not illustrated) can protrude from the front face 21' and mate with corresponding alignment holes in the tool unit 60' to align the coupling unit 20' and the tool unit 60'.

Figure 12:
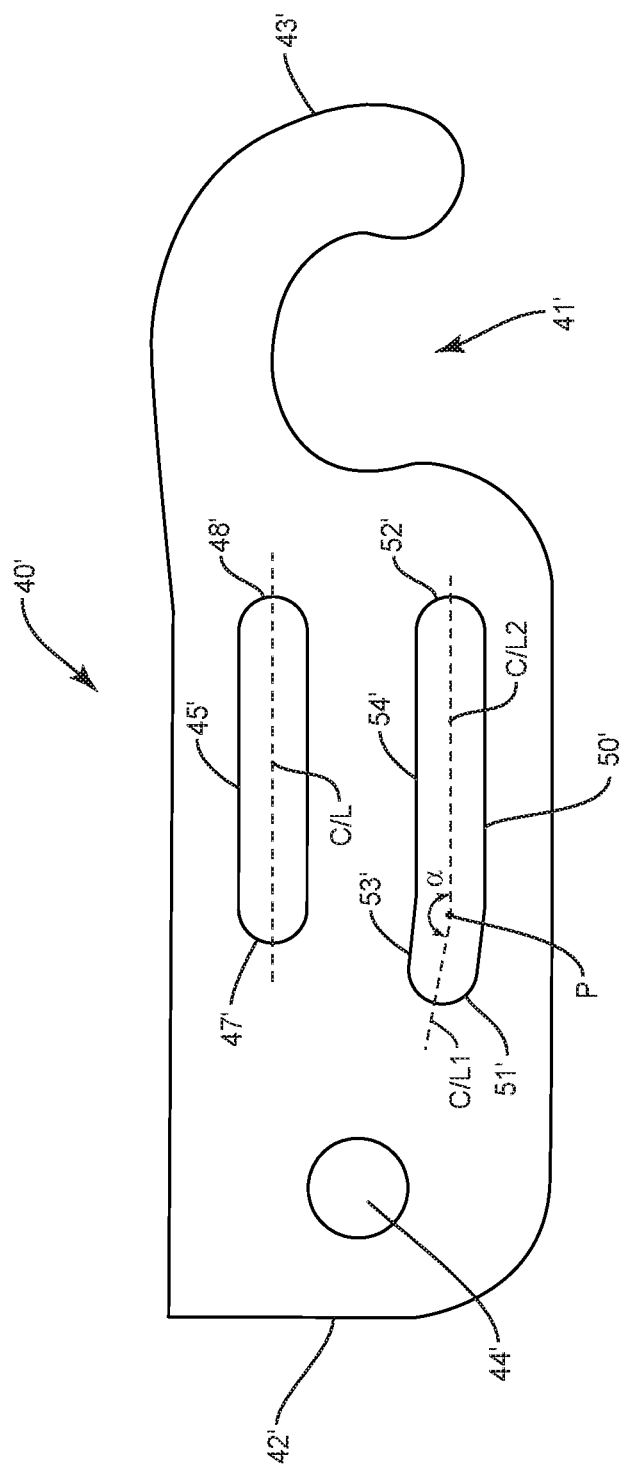
FIG. 12 is a side view of a cam member.

The cam member 40' protrudes from the body 29' and includes a receptacle 41' to selectively engage with the tool unit 60'. As illustrated in FIG. 12, the cam member 40' includes a first end 42' and a second end 43'. The receptacle 41' that receives the latching pin 64' of the tool unit 60' is positioned in proximity to the second end 43'. An opening 44' in proximity to the first end 42' provides for a fastener to connect the cam member 40' with the connection arm 80'.

A pair of slots 45', 50' extends along a central area of the cam member 40'. Connectors 56', 57' extend from the body 29' and are positioned in the slots 45', 50' respectively to connect the cam member 40' to the body 29'. The connectors 56', 57' slide along one or more surfaces of the slots 45', 50'. The first slot 45' extends between first and second ends 47', 48' and has a straight centerline C/L. The second slot 50' includes a first end 51' and a second end 52'. A first section 53' extends between the first end 51' to a point P and includes a straight centerline C/L1. A second section 54' extends between the second end 52' and the point P and includes a straight centerline C/L2. The centerlines C/L1, C/L2 are aligned at an obtuse angle α. In one example, the slot 50' includes a length measured between the first and second ends 51', 52' that is greater than a length of the slot 45' (measured between the first and second ends 47', 48'). In one example, the slot 50' extends farther towards the first end 42' of the cam member 40' than the slot 45'. In one example, the first end 51' of slot 50' is in closer proximity to the first end 42' of the cam member 40' than the first end 47' of slot 45'.

Figure 11:
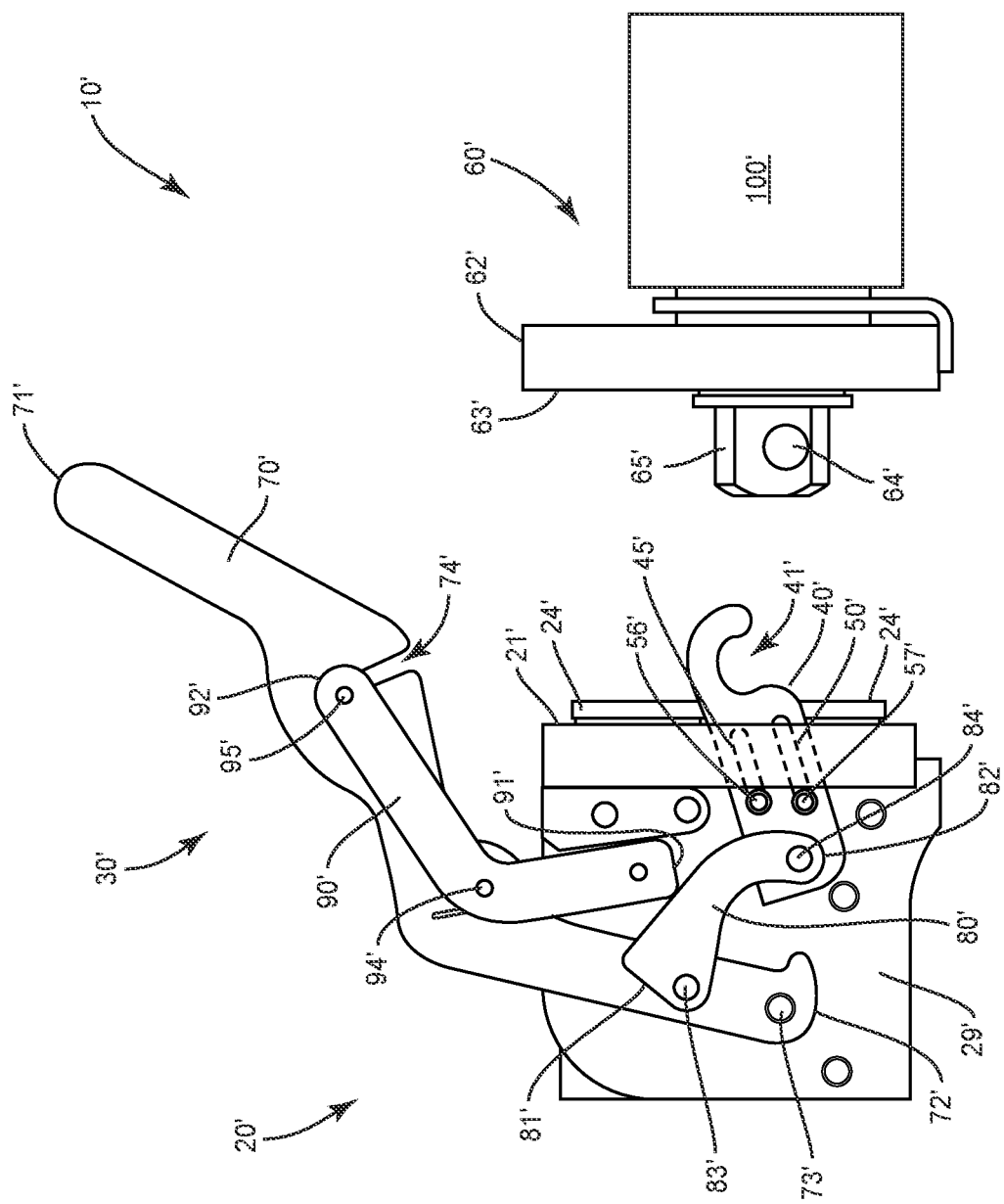
FIG. 11 is a side view of a coupling unit positioned in proximity to a tool unit and with a handle of the coupling unit in a first position.

The handle 30' is connected to the cam member 40' to selectively move the cam member 40' in a linear direction relative to the front face 21' between engaged and disengaged positions. The handle 30' includes rigid elongated members including a lever arm 70', a connector arm 80', and a linkage 90'. As illustrated in FIG. 11, the lever arm 70' includes an elongated shape that extends between a first end 71' and a second end 72'. The lever arm 70' is connected to the body 29' at a connector 73' that is in proximity to the second end 72'. A slot 74' extends into an intermediate section of the lever arm 70' to connect with the linkage 90'.

The connection arm 80' extends between and is pivotally connected to each of the lever arm 70' and the cam member 40'. In one example, the connection arm 80' is not connected to the body 29'. The connection arm 80' includes a first end 81' and opposing second end 82'. A first connector 83' is positioned in proximity to the first end 81' to pivotally connect the connection arm 80' to the lever arm 70'. A second connector 84' is positioned in proximity to the second end 82' to connect the connection arm 80' to the cam member 40'.

The linkage 90' includes a first end 91' and an opposing second end 92'. The linkage 90' has an L-shape formed by a first section at the first end 91' and a second section at the second end 92'. In one example, the sections are aligned at a right angle. In another example, the sections are aligned at an obtuse angle. A connector 94' at an intermediate section pivotally connects the linkage 90' to the lever arm 70'. A second connector 95' in proximity to the second end 92' is positioned within the slot 74' in the lever arm 70'.

The tool unit 60' includes a body 62' with a front face 63' that faces towards the coupling unit 20'. The utility couplings 61' extend through the front face 63' and engage with the corresponding utility couplings 24' of the coupling unit 20'. In one example, the utility couplings 61' comprise openings that receive the utility couplings 24' that extend outward beyond the body 29' of the coupling unit 20'. The utility couplings 24', 61' when mated together are configured to pass materials, such as pneumatic or hydraulic fluid. The latching pin 64' is positioned to engage with the cam member 40'. The latching pin 64' can be mounted to an extension 65' that extends outward beyond the front face 63'.

The coupling unit 20' and the tool unit 60' are configured to engage together to couple the utility couplings 24', 61'. This provides for the one or more utilities to pass to the industrial equipment that is associated with the tool unit 60'. FIGS. 11-16 illustrate the positioning and movements of the coupling unit 20' and tool unit 60' during the engagement and disengagement.

Figure 13:
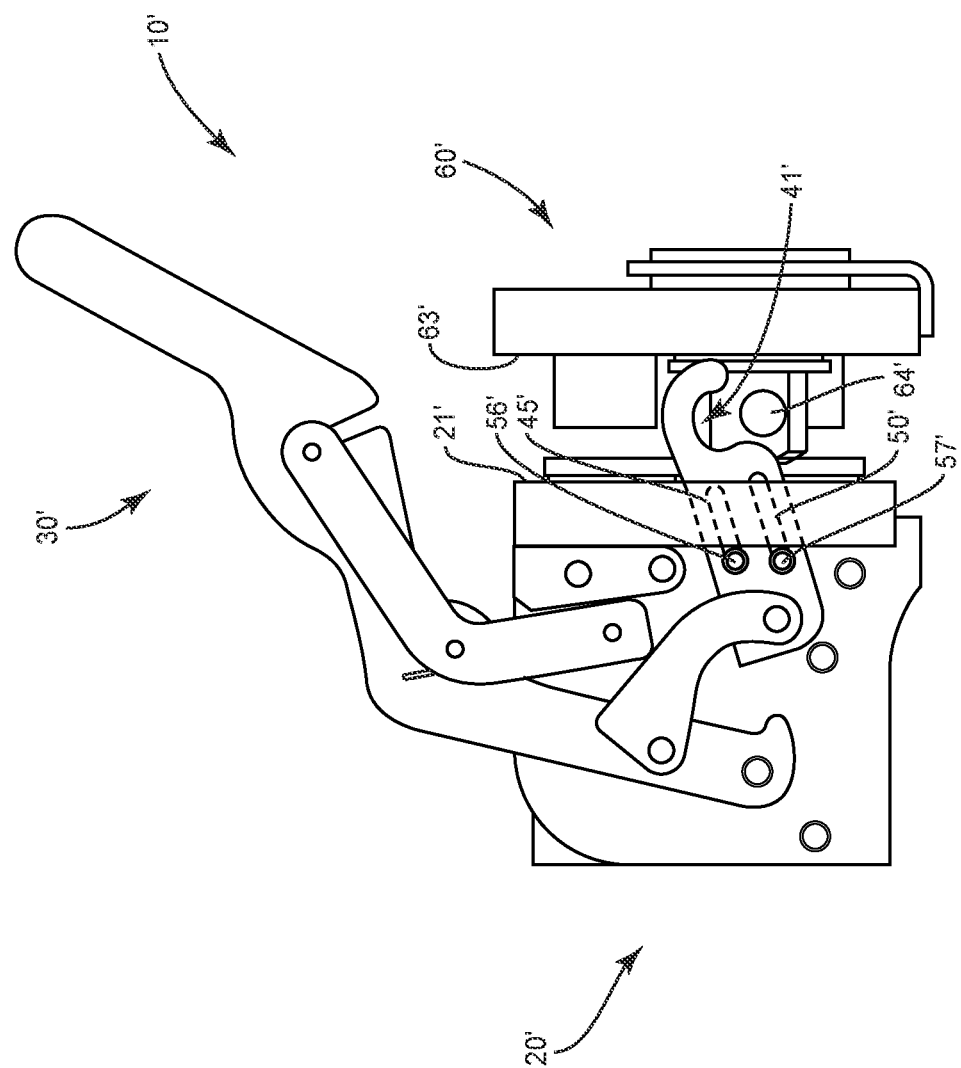
FIG. 13 is a side view of a coupling unit positioned at a tool unit and with a handle of the coupling unit in a first position.

As illustrated in FIG. 13, the coupling unit 20' and the tool unit 60' are brought together with the front face 21' of the coupling unit 20' positioned in proximity to the front face 63' of the tool unit 60'. The handle 30' is in a first position that is upward above the body 29'. In this first position, the cam member 40' extends outward beyond the front face 21' and is positioned at a first angular position relative to the front face 21'. The cam member 40' is positioned away from and disengaged from the latching pin 64' of the tool unit 60'. In one example as illustrated in FIG. 13, the cam member 40' is positioned with the receptacle 41' positioned above the latching pin 64'. The cam member 40' is further positioned outward with the connectors 56', 57' located at the first ends 47', 51' of the respective slots 45', 50'. This locates the connector 57' along the first section 53' of the slot 50'. The handle 30' can be in an overlapping arrangement with the tool unit 60'.

Figure 14:
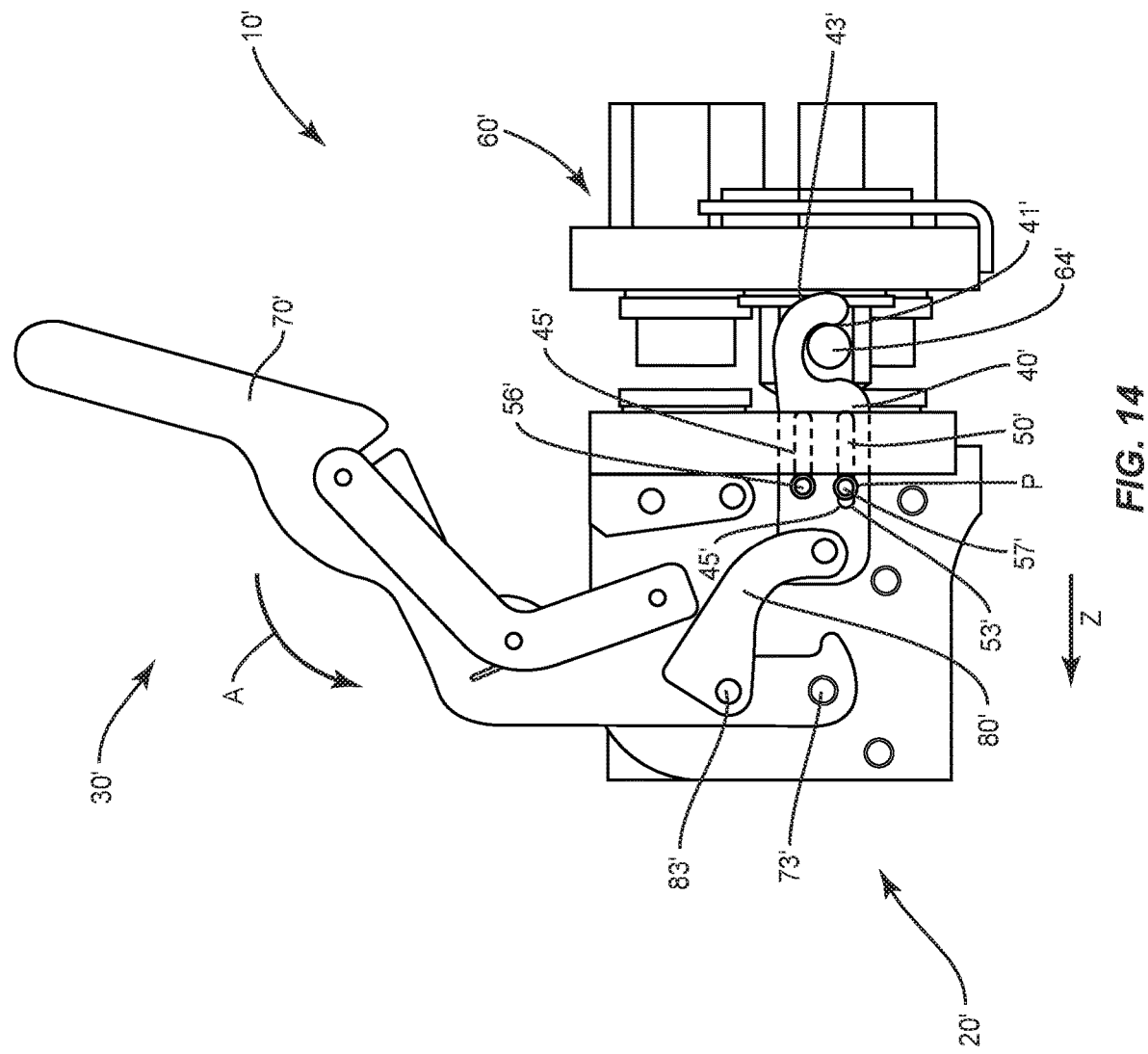
FIG. 14 is a side view of a coupling unit positioned at a tool unit and with a handle of the coupling unit in a second position.

As illustrated in FIG. 14, the handle 30' is pivoted about connector 73' in the direction of arrow A. This movement applies a force in the direction of arrow Z to the connection arm 80' and the cam member 40'. The cam member 40' pivots about the connector 56' in the first slot 45' as the second slot 50' slides along the connector 57'. This movement causes the slot 50' to slide along connector 57' with the connector 57' moving from the first end 51' of the slot 50' to the point P (i.e., the first section 53' of the slot 50' moves along the connector 57'). This causes a change in the angular orientation of the cam member 40'. As illustrated in FIG. 14, the second end 43' of the cam member 40' pivots downward and the receptacle 41' engages with the latching pin 64'.

Figure 15:
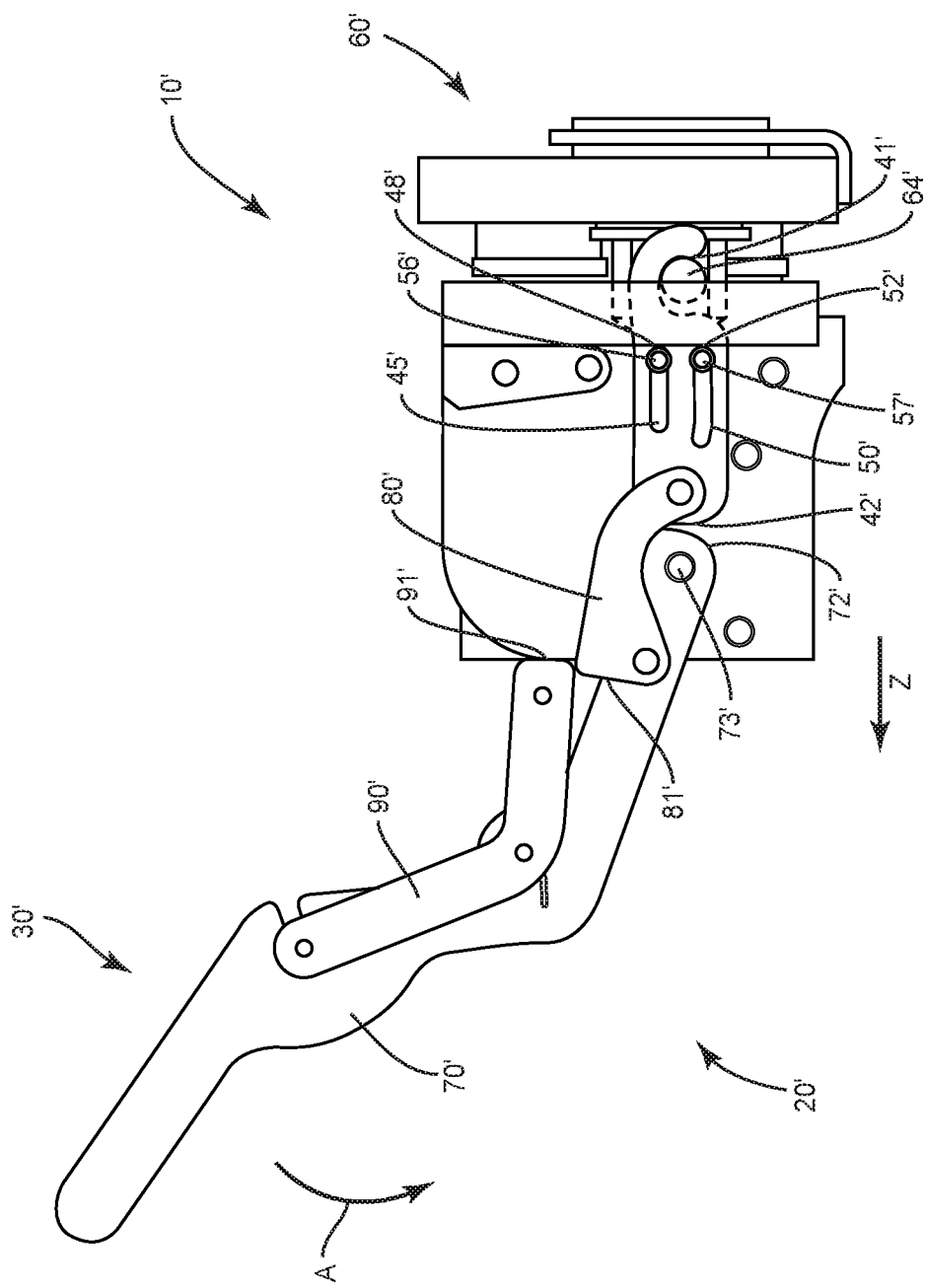
FIG. 15 is a side view of a coupling unit positioned at a tool unit and with a handle of the coupling unit in a third position.

FIG. 15 illustrates the position after additional pivoting movement of the lever arm 70' in the direction of arrow A about the connector 73'. This additional movement causes the connection arm 80' and the cam member 40' to move farther in the direction of arrow Z. The slots 45', 50' in the cam member 40' slide along the connectors 56', 57' until the connectors 56', 57' contact against the second ends 48', 52' of the slots 45', 50' respectively. The cam member 40' retracts inward in the body 29'. The movement also causes the linkage 90' to slide along the top of the connection arm 80' with the first end 91' of the linkage 90' moving towards the first end 81' of the connection arm 80'.

Figure 16:
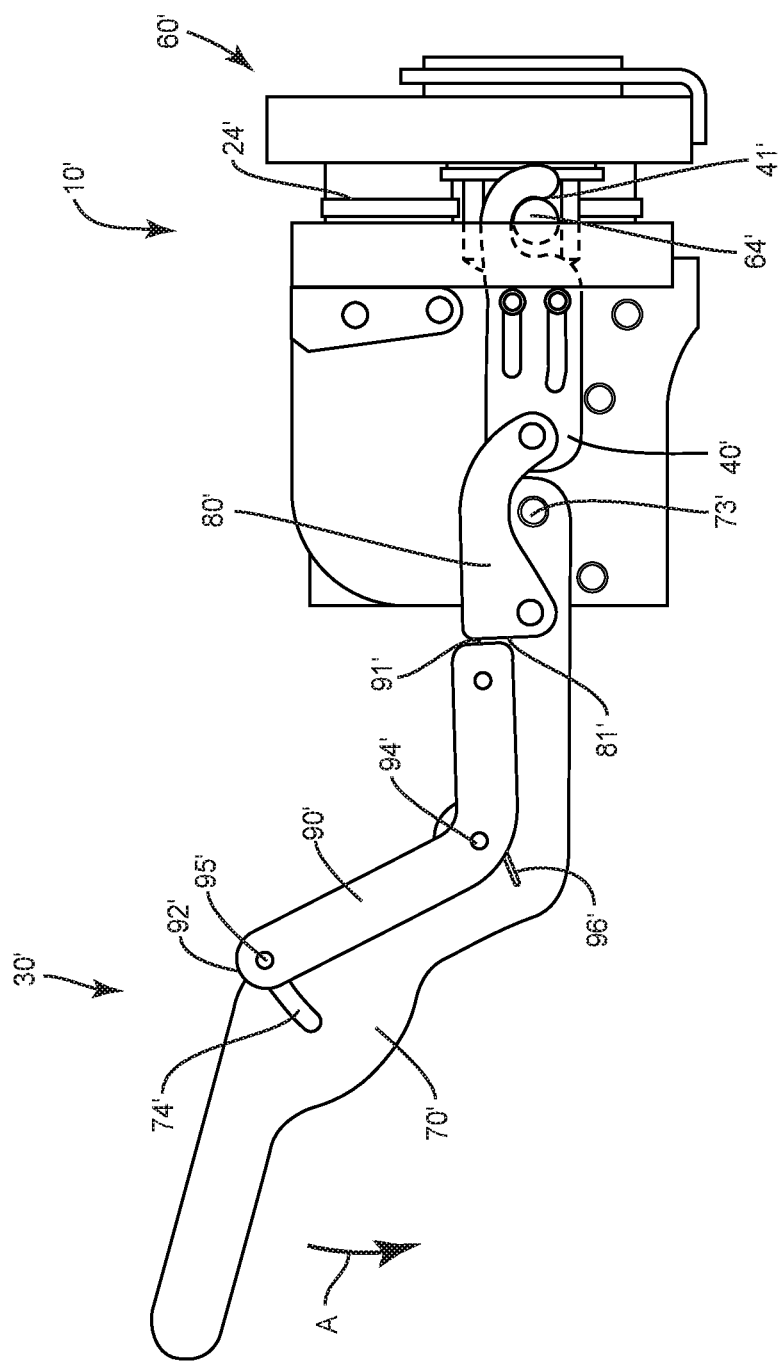
FIG. 16 is a side view of a coupling unit positioned at a tool unit and with a handle of the coupling unit in a locked position.

FIG. 16 illustrates the position after the lever arm 70' has pivoted farther about the connector 73' in the direction indicated by arrow A. A biasing member 96', such as a spring, applies a force to the linkage 90' that applies a downward force to the first end 91' of the linkage 90'. The first end 91' of the linkage 90' moves past the first end 81' of the connection arm 80' causing the linkage 90' to pivot about the connector 73' (i.e., pivot in a clockwise direction as illustrated in FIG. 16). The first end 91' of the linkage 90' contacts against and slides across the first end 81' of the connection arm 80'. Further, the connector 95' at the second end 92' of the linkage 90' moves outward within the slot 74' away from a longitudinal center of the lever arm 70'.

FIG. 16 illustrates the utility coupler 10' in a locked position with the coupling unit 20' engaged with the tool unit 60'. The abutment between the first ends 81', 91' of the connection arm 80' and linkage 90' prevents the lever arm 70' from being pivoted upward in the opposing direction to arrow A thus locking the handle 30'. In this position, the cam member 40' is engaged with the latching pin 64' thus coupling together the coupling unit 20' and the tool unit 60'. In one example, the movement of the first end 91' of the linkage 90' along the first end 81' of the connector 80' causes an audible or tactile indicator to the user. This indicator confirms to the user that the handle 30' is in the locked position.

The connectors 56', 57' slide along the surfaces of the slots 45', 50'. In another example, one or both connectors 56', 57' slide along one or more surfaces on the exterior of the cam member 40'.

In the locked position, the utility coupling units 24', 61' are engaged together. This provides for the passage of one or more utilities to industrial equipment (that is connected to the tool unit 60' but not illustrated in FIG. 16).

Figure 17:
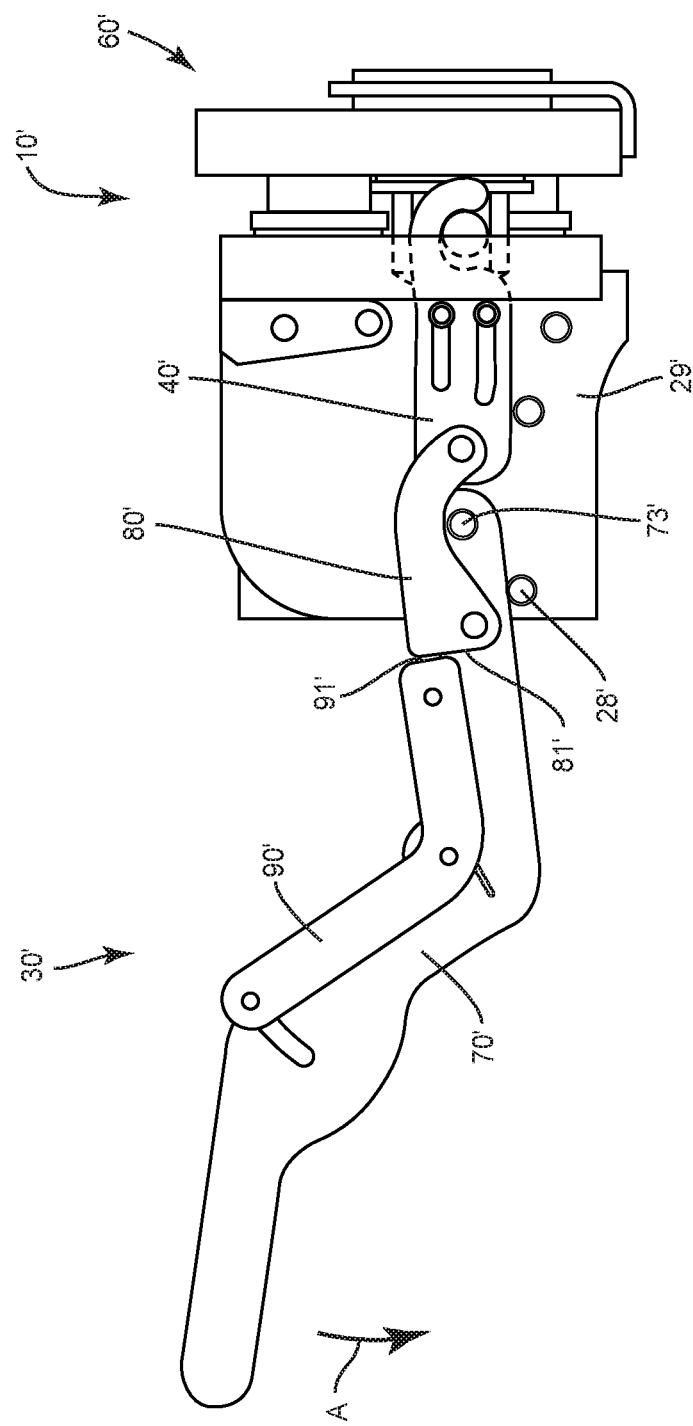
FIG. 17 is a side view of a coupling unit positioned at a tool unit and with a handle of the coupling unit moved beyond a locked position.

The handle 30' can be unlocked by pivoting the lever arm 70' farther about the connector 73' in the direction indicated by arrow A. As illustrated in FIG. 17, the extent of the pivoting movement of the lever arm 70' is limited by the lever arm 70' contacting against a post 28' that extends outward from the body 29' and contacts against an underside of the lever arm 70'. This additional pivoting movement causes the linkage 90' to move relative to the connection arm 80'. The first ends 81', 91' move apart or pivot relative to each other such that just a lower edge of the first end 91' is in contact with the first end 81' (and the upper edge of the first end 91' moves away from the first end 81').

Figure 10:
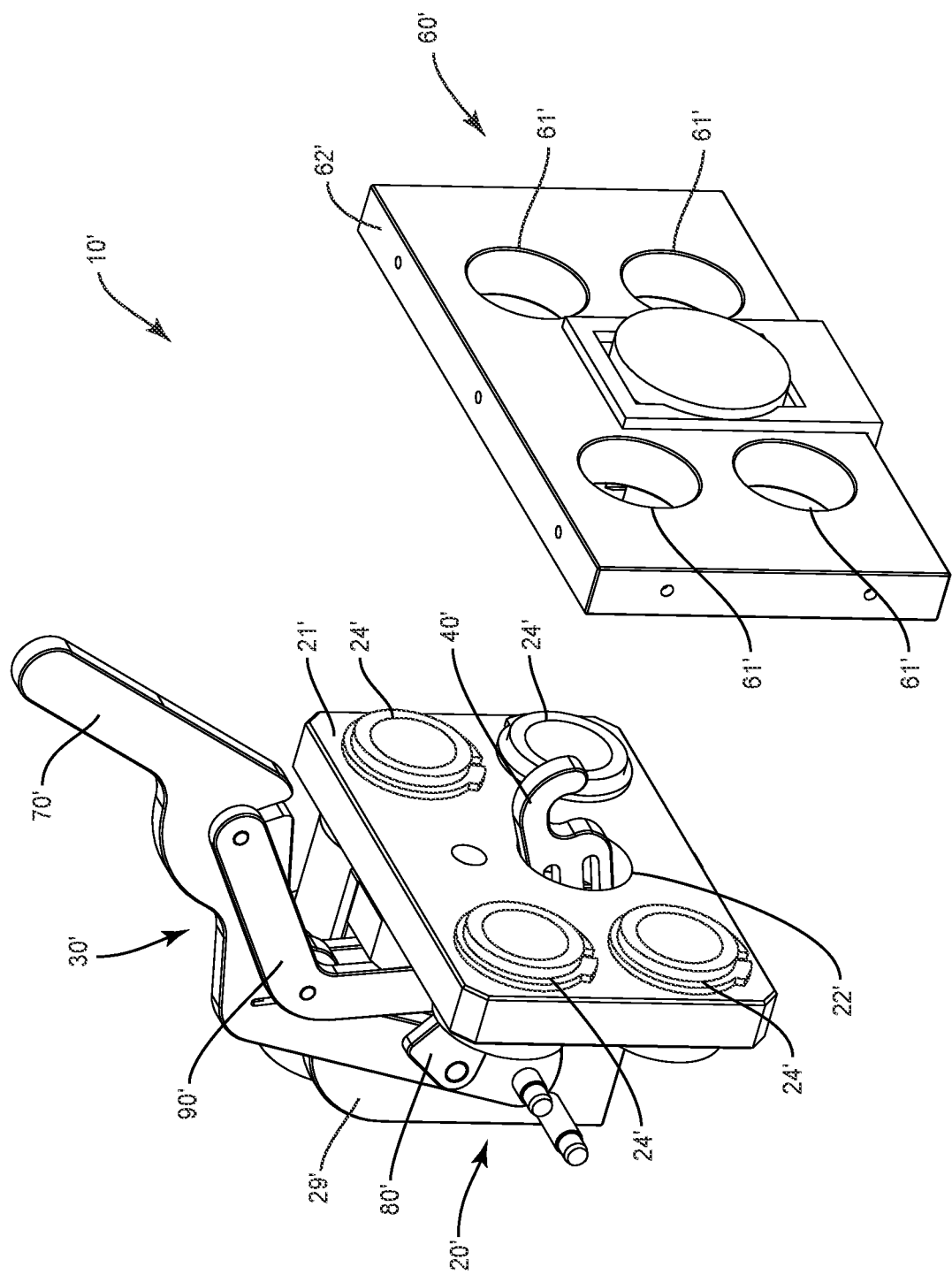
FIG. 10 is a perspective view of a coupling unit positioned in proximity to a tool unit.
Figure 18:
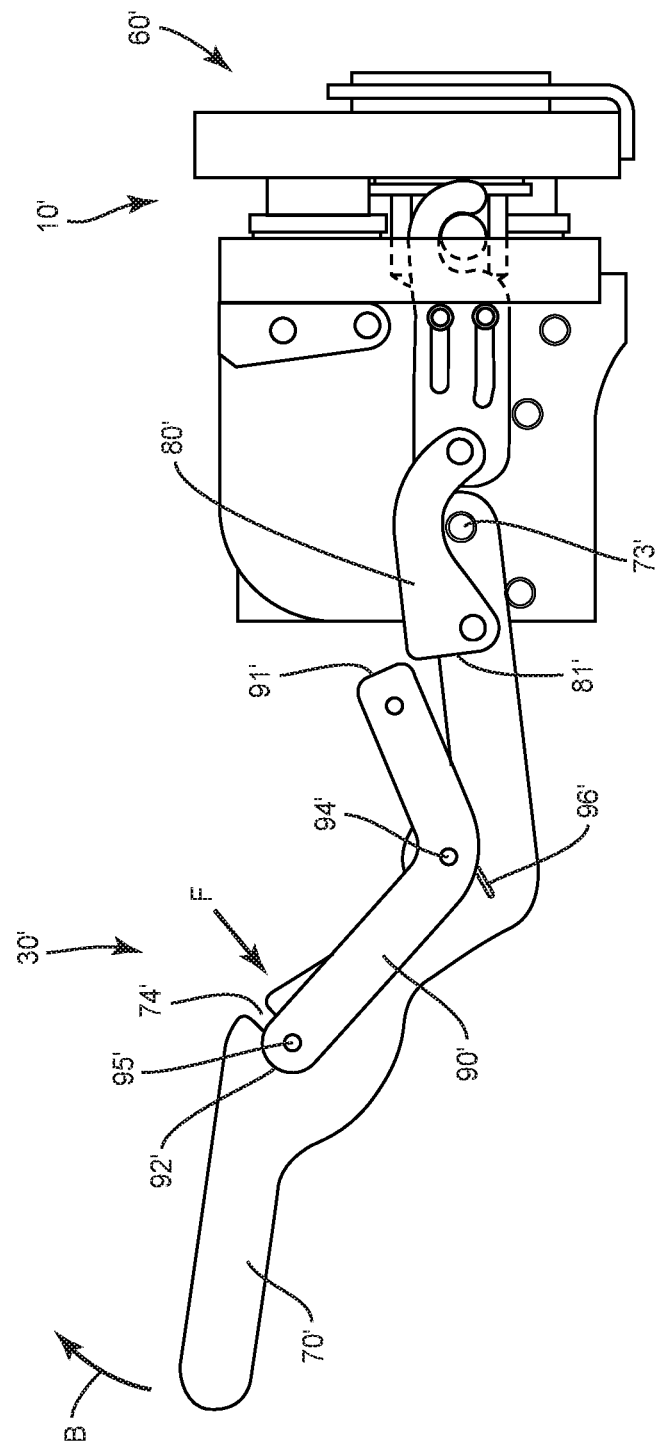
FIG. 18 is a side view of a coupling unit positioned at a tool unit and with a handle of the coupling unit positioned to an unlocked position.

As illustrated in FIG. 18, a force F can be applied to the linkage 90' in proximity to the second end 92'. This force causes the linkage 90' to pivot about the connector 94' with the first end 91' moving upward away from the first end 81' of the connector arm 80' and connector 95' at the second end 92' moving downward along the slot 74'. With the first end 91' of the linkage 90' positioned away from the first end 81' of the connector arm 80', the lever arm 70' can be pivoted in the direction of arrow B. This movement reverses the various movements of the lever arm 70', connector arm 80', and linkage 90' resulting in the cam member 40' disengaging from the latching pin 64' as illustrated in FIGS. 10 and 11.

Figure 19:
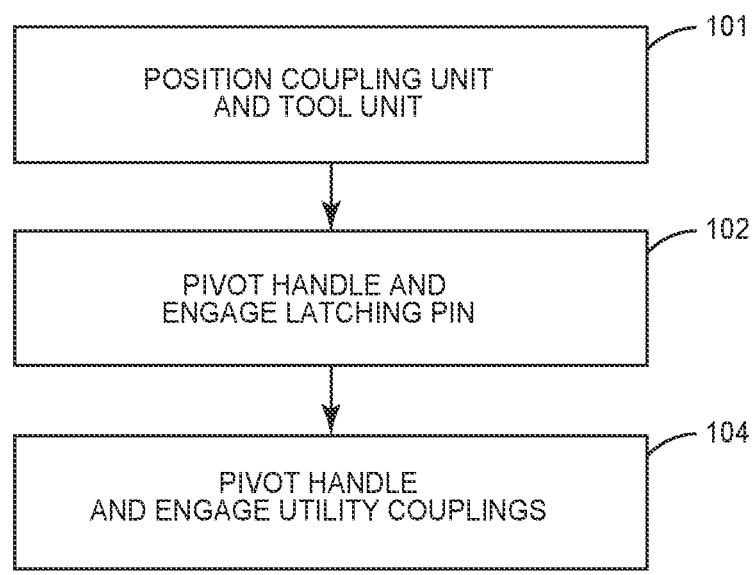
FIG. 19 is a flowchart diagram of a method of supplying utilities to industrial equipment.

FIG. 19 illustrates a flowchart of a method of supplying utilities to industrial equipment. The method includes positioning a coupling unit 20 at a tool unit 60 while a handle 30 of the coupling unit 20 is in a first position (block 101). This first position locates a cam member 40 of the coupling unit 20 and that is connected to the handle 30 in a first angular position away from a latching pin 64 of the tool unit 60.

The handle 30 is pivoted to engage the latching pin 64 (block 102). The pivoting movement moves a first section 53 of a slot 50 in the cam member 40 along a connector 57. This also moves the cam member 40 towards the latching pin 64 and to a second angular position that engages the latching pin 64.

The handle 30 is pivoted farther to engage the utility couplings 24, 61 (block 104). The pivoting movement moves a second section 54 of the slot 50 along the connector 57 and linearly moves the cam member 40 and engages the one or more second utility couplings 24 on the coupling unit 20 with the one or more first utility couplings 64 of the tool unit 60.

The utility coupling 10 according to embodiments of the present invention presents numerous advantages over the prior art. The utility coupling 10 provides an easy, reliable way to selectively provide utilities to industrial equipment.

The handle 30 provides for a straightforward and secure manner of engaging the locking the coupling unit 20 to the tool unit 60. The handle 30 also provides for straightforward manner of unlocking and disengaging the coupling unit 20. The handle 30 can also provide significant force, through mechanical advantage, pulling the coupling unit 20 into tight abutment against the tool unit 60, as the handle 30 moves from the first position towards the second position.

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

The present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A utility coupler operative to provide one or more utilities to industrial equipment, the utility coupler comprising:
   a tool unit operatively connected to the industrial equipment, the tool unit comprising:
      a latching pin; and
      one or more first utility couplings; and
   a coupling unit comprising:
      a body with a front face;
      one or more second utility couplings;
      a handle pivotally connected to the body and movable between a first position and a second position; and
      a cam member movably attached to the body and the handle, the cam member comprising:
         a receptacle;
         a first slot with a first section and a second section that are aligned at a non-linear angle and with the first slot configured to receive a first connector;
         a second slot that receives a second connector;
      wherein in the first position, the cam member is aligned at a first angle relative to the front face of the body to position the receptacle away from the latching pin of the tool unit and with the first connector positioned in the first section of the first slot; and
      wherein in the second position, the cam member is aligned at a second angle relative to the front face of the body that is different than the first angle to engage the receptacle with the latching pin of the tool unit and to couple together the one or more first and second utility couplings to pass the utilities to the industrial equipment and with the first connector positioned in the second section of the first slot.

2. The utility coupler of claim 1, wherein the cam member moves inward relative to the front face when the handle moves from the first position to the second position.

3. The utility coupler of claim 1, wherein the second slot comprises a shorter length than the first slot.

4. The utility coupler of claim 1, wherein the handle comprises a plurality of rigid members that are pivotally connected together.

5. The utility coupler of claim 4, wherein the plurality of rigid members comprises first and second rigid members with contact surfaces that are spaced apart in the first position and that abut together in the second position to prevent movement of the handle from the second position to the first position.

6. The utility coupler of claim 1, wherein the receptacle of the cam member is positioned outward beyond the front face of the body and a connector that pivotally connects the handle to the body is positioned inward of the front face of the body.

7. The utility coupler of claim 1, wherein the handle is in an overlapping position with the tool unit in one of the first and second positions.

8. The utility coupler of claim 1, wherein each of the first and second sections include straight centerlines that are aligned at an obtuse angle.

9. The utility coupler of claim 8, wherein the first slot and the second slot extend along a central area of the cam member.

10. A utility coupler operative to provide one or more utilities to industrial equipment, the utility coupler comprising:
   a tool unit operatively connected to the industrial equipment, the tool unit comprising:
      a first body;
      a latching pin attached to the first body; and
      one or more first utility couplings;
   a coupling unit comprising:
      a second body;
      a cam member movably attached to the second body and comprising a receptacle;
      a handle pivotally connected to the second body and also connected to the cam member, the handle movable between a first position and a second position; and
      one or more second utility couplings operative to mate with the first utility couplings;
   wherein in the first position, the cam member extends outward beyond the second body by a first distance and is aligned at a first angle relative to the second body to position the receptacle away from the latching pin of the tool unit; and
   wherein in the second position, the cam member extends outward beyond the second body by a second distance that is smaller than the first distance and is aligned at a second angle relative to the second body that is different than the first angle to engage the receptacle with the latching pin of the tool unit and with the one or more first and second utility couplings being coupled together to pass the one or more utilities to the industrial equipment;
   wherein the cam member comprises one or more slots that each extend along the cam member, each of the one or more slots are engaged by a connector on the body of the coupling unit, each of the one or more slots comprising a first end and an opposing second end with the connector positioned at the first end in the first position and at the second end in the second position.

11. The utility coupler of claim 10, further comprising:
   the second body comprising a front face;
   the receptacle being positioned on a first side of the front face in both the first and second positions; and
   the handle being pivotally connected to the second body at a pivot that is positioned on an opposing second side of the front face.

12. The utility coupler of claim 10, wherein one of the slots comprises a first surface at the first end and a second surface at the second end, the first and second surfaces being straight and being aligned at an obtuse angle relative to one another.

13. The utility coupler of claim 10, wherein the handle comprises a plurality of individual rigid members that are pivotally connected to each other.

14. A method of supplying utilities to industrial equipment that is operatively connected to a tool unit, the method comprising:
positioning a coupling unit at the tool unit while a handle of the coupling unit is in a first position that locates a cam member of the coupling unit that is connected to the handle in a first angular position away from a latching pin of the tool unit;
pivoting the handle and moving a first section of a surface on the cam member along a connector and moving the cam member towards the latching pin to a second angular position and engaging the latching pin; and
pivoting the handle and moving a second section of the surface along the connector and linearly moving the cam member and retracting the cam member into the coupling unit and pulling the tool unit into engagement with the coupling unit and engaging second utility couplings on the coupling unit first utility couplings of the tool unit.

15. The method of claim 14, further comprising pivoting the handle a first amount and moving the first section of the surface along the connector and then pivoting the handle an additional second amount and linearly moving the cam member.

16. The method of claim 14, further comprising maintaining the cam member at the second angular position while moving a second section of the surface along the connector and linearly moving the cam member.

17. The method of claim 14, wherein the surface is positioned within a slot.

18. The method of claim 14, further comprising pivoting the handle to a closed position with the first and second utility couplings engaging together and abutting together ends of first and second members of the handle and preventing the handle from moving from the closed position back towards an open position.

19. The method of claim 14, further comprising pivoting the handle a first amount and pivoting the cam member to the second angular position that engages the latching pin prior to pivoting the handle an additional second amount that linearly moves the cam member and engages the first and second utility couplings.

20. The method of claim 14, wherein moving the handle comprises pivoting the handle about a pivot that is positioned on a first side of a face of the coupling unit and maintaining the receptacle of the cam member on an opposing side of the face of the coupling unit.

* * * * *